United States Patent
Wu et al.

(10) Patent No.: US 12,218,372 B2
(45) Date of Patent: Feb. 4, 2025

(54) NECK-MOUNTED POWER BANK

(71) Applicant: HTC Corporation, Taoyuan (TW)

(72) Inventors: Jia Shan Wu, Taoyuan (TW);
Wei-Cheng Liu, Taoyuan (TW);
Chun-Lung Chu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 424 days.

(21) Appl. No.: 17/745,888

(22) Filed: May 17, 2022

(65) Prior Publication Data

US 2023/0238637 A1    Jul. 27, 2023

Related U.S. Application Data

(60) Provisional application No. 63/302,961, filed on Jan. 25, 2022.

(51) Int. Cl.
*H01M 50/256*     (2021.01)
*H01M 50/207*     (2021.01)
*H01M 50/247*     (2021.01)

(52) U.S. Cl.
CPC ....... *H01M 50/256* (2021.01); *H01M 50/207* (2021.01); *H01M 50/247* (2021.01); *H01M 2220/30* (2013.01)

(58) Field of Classification Search
None
See application file for complete search history.

(56) References Cited

U.S. PATENT DOCUMENTS

| | | | | |
|---|---|---|---|---|
| 3,609,262 A | * | 9/1971 | Hotchkiss | H01M 50/213 200/DIG. 2 |
| 2016/0301044 A1 | * | 10/2016 | Huang | H01M 50/296 |
| 2016/0341949 A1 | * | 11/2016 | Heinrich | G02B 23/18 |
| 2020/0187574 A1 | * | 6/2020 | Te Hsiang | A41D 13/0053 |
| 2021/0391620 A1 | * | 12/2021 | Porter | H01M 50/247 |

FOREIGN PATENT DOCUMENTS

| | | |
|---|---|---|
| CN | 215067588 | 12/2021 |
| KR | 20190103674 | 9/2019 |
| TW | M530977 | 10/2016 |

OTHER PUBLICATIONS

"Office Action of Taiwan Counterpart Application", issued on Oct. 18, 2022, pp. 1-6.

* cited by examiner

*Primary Examiner* — Gregg Cantelmo
(74) *Attorney, Agent, or Firm* — JCIPRNET (57) ABSTRACT

A neck-mounted power bank is suitable for being hung on a user's neck to supply power to an electronic device. The neck-mounted power bank includes a body, a battery, and a pair of adjustable assemblies. The battery is disposed in the body. The pair of adjustable assemblies are respectively connected to two ends of the body, and define a wearing space with the body. The pair of adjustable assemblies can be rotated relative to the body so as to adjust the size of the wearing space. Each of the pair of adjustable assemblies includes a rotate arm and an angle arm. The rotate arm is rotatably connected to a corresponding end of the body. The angle arm is connected to the rotate arm and has a contact surface. The contact surface is suitable for contacting the user's neck.

7 Claims, 13 Drawing Sheets

NECK-MOUNTED POWER BANK

CROSS-REFERENCE TO RELATED APPLICATION

This application claims the priority benefit of U.S. provisional application Ser. No. 63/302,961, filed on Jan. 25, 2022. The entirety of the above-mentioned patent application is hereby incorporated by reference herein and made a part of this specification.

BACKGROUND

Technical Field

The disclosure relates to a power bank, and in particular relates to a neck-mounted power bank.

Description of Related Art

With advancements of technology industry, the types, function and ways of use of display devices are becoming more and more diverse, and head-mounted display devices that may be directly worn on user's body are correspondingly developed. When using the head-mounted display device, the head-mounted display device needs to be worn on the user's head. In order to facilitate the user's mobility, the head-mounted display device is designed with a detachable battery, so as to make the head-mounted display device light weight. However, how to comfortably mount the detachable battery on the user's body is an important development at the current stage.

SUMMARY

The disclosure provides a neck-mounted power bank for supplying power to an electronic device and providing user wearing comfort.

The neck-mounted power bank of the disclosure is suitable for being hung on a user's neck to supply power to an electronic device. The neck-mounted power bank includes a body, a battery, and a pair of adjustable assemblies. The battery is disposed in the body. The pair of adjustable assemblies are respectively connected to two ends of the body, and define a wearing space with the body. The pair of adjustable assemblies may be rotated relative to the body so as to adjust the size of the wearing space. Each of the pair of adjustable assemblies includes a rotate arm and an angle arm. The rotate arm is rotatably connected to a corresponding end of the body. The angle arm is connected to the rotate arm and has a contact surface. The contact surface is suitable for contacting the user's neck.

Based on the above, in the disclosure, the neck-mounted power bank may be worn on the user's neck and is connected to the electronic device by an electrical cable. Since the adjustable assemblies may be rotated relative to the body, the user may change the size of the wearing space of the neck-mounted power bank through adjusting the adjustable assemblies to fit the size of the user's neck. The user may adjust the angle of the adjustable assemblies to increase the contact area between the neck-mounted power bank and the user's neck, thereby increase the stability and comfort of wearing.

DESCRIPTION OF THE EMBODIMENTS

Figure 1A:
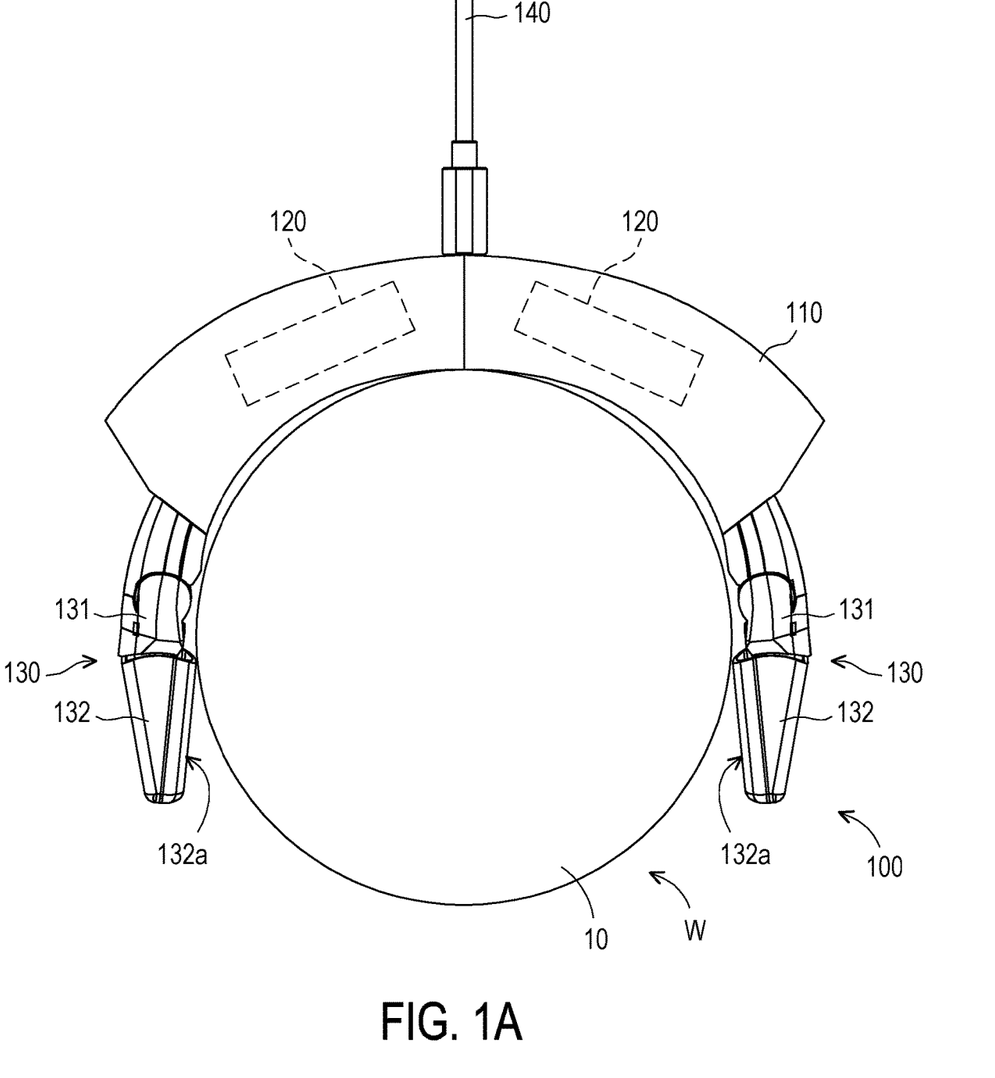
FIG. 1A is a schematic view of a neck-mounted power bank of an embodiment of the invention.
Figure 1B:
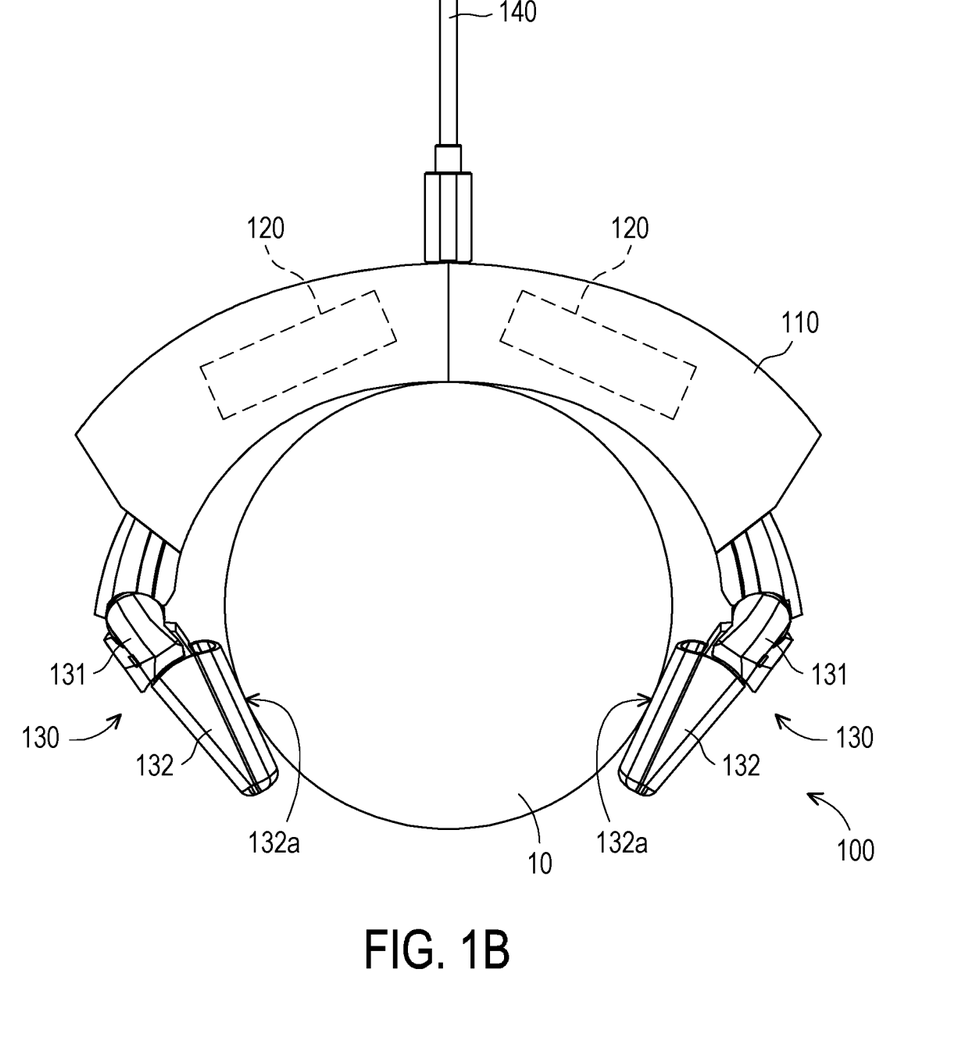
FIG. 1B is a schematic view of the neck-mounted power bank of FIG. 1A in another usage mode.
Figure 2A:
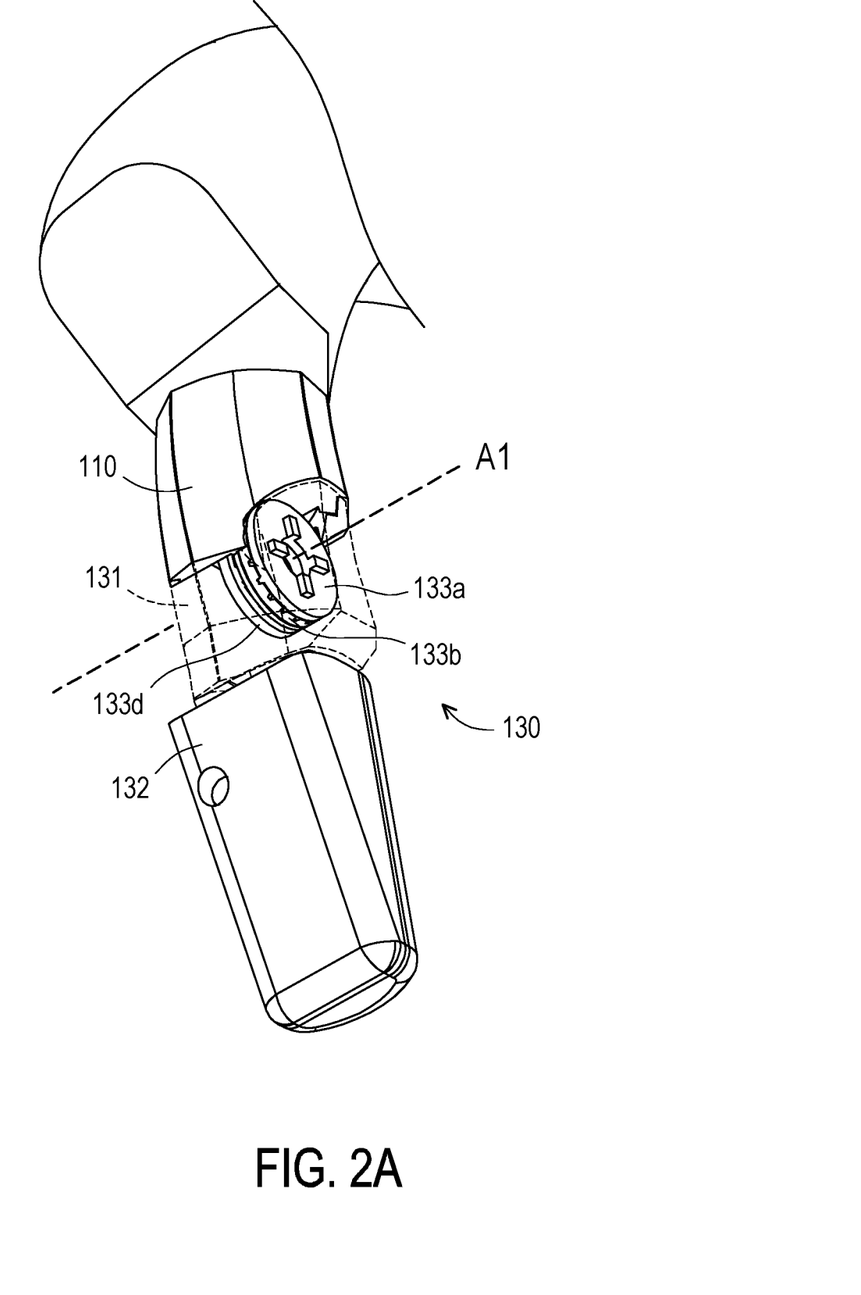
FIG. 2A is a partially enlarged view of the rotate arm of FIG. 1A.
Figure 2B:
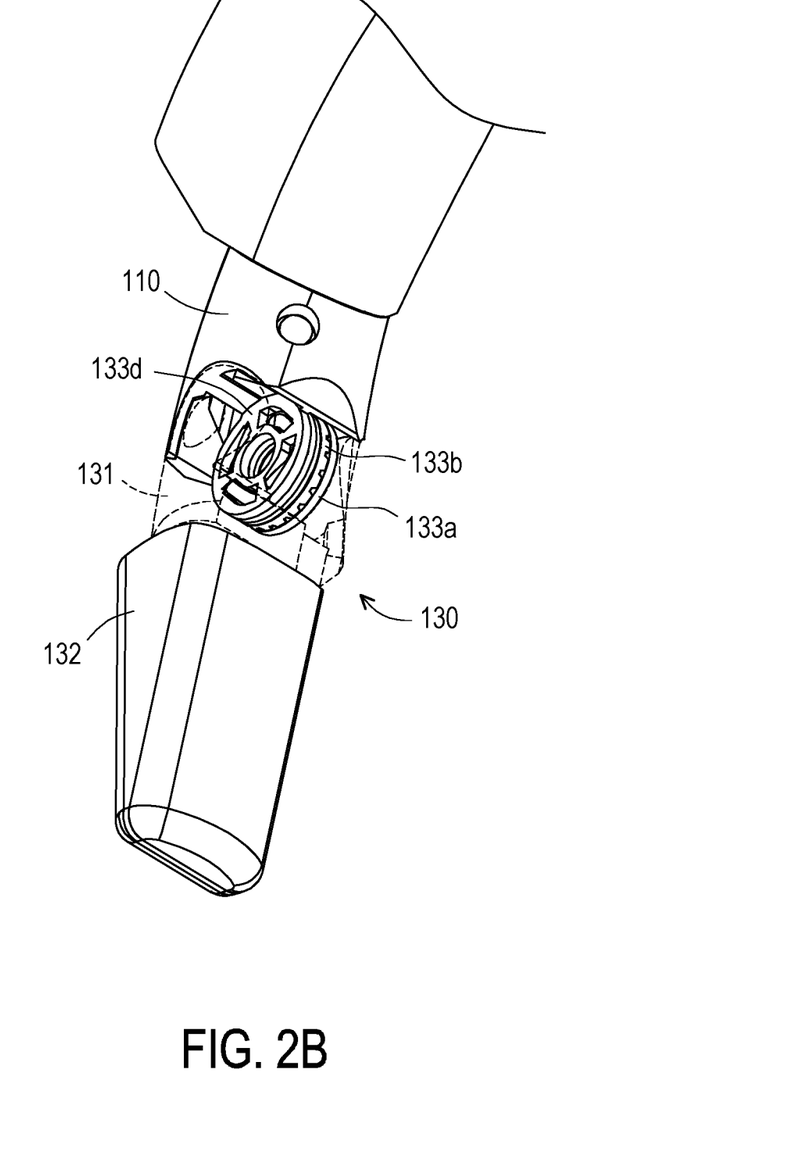
FIG. 2B is a schematic view of the rotate arm of FIG. 2A from another viewing angle.
Figure 2C:
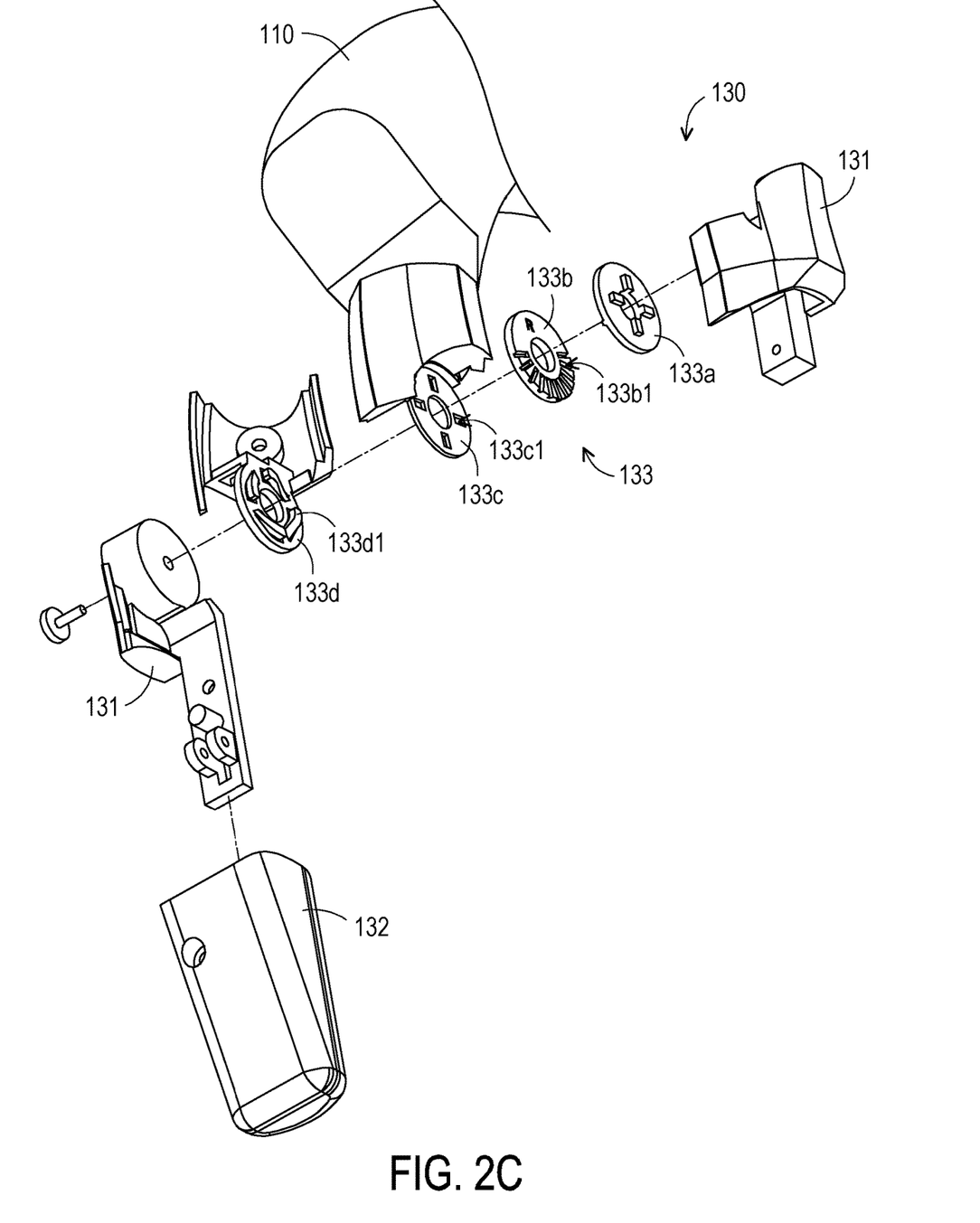
FIG. 2C is an exploded view of the rotate arm of FIG. 2A.
Figure 2D:
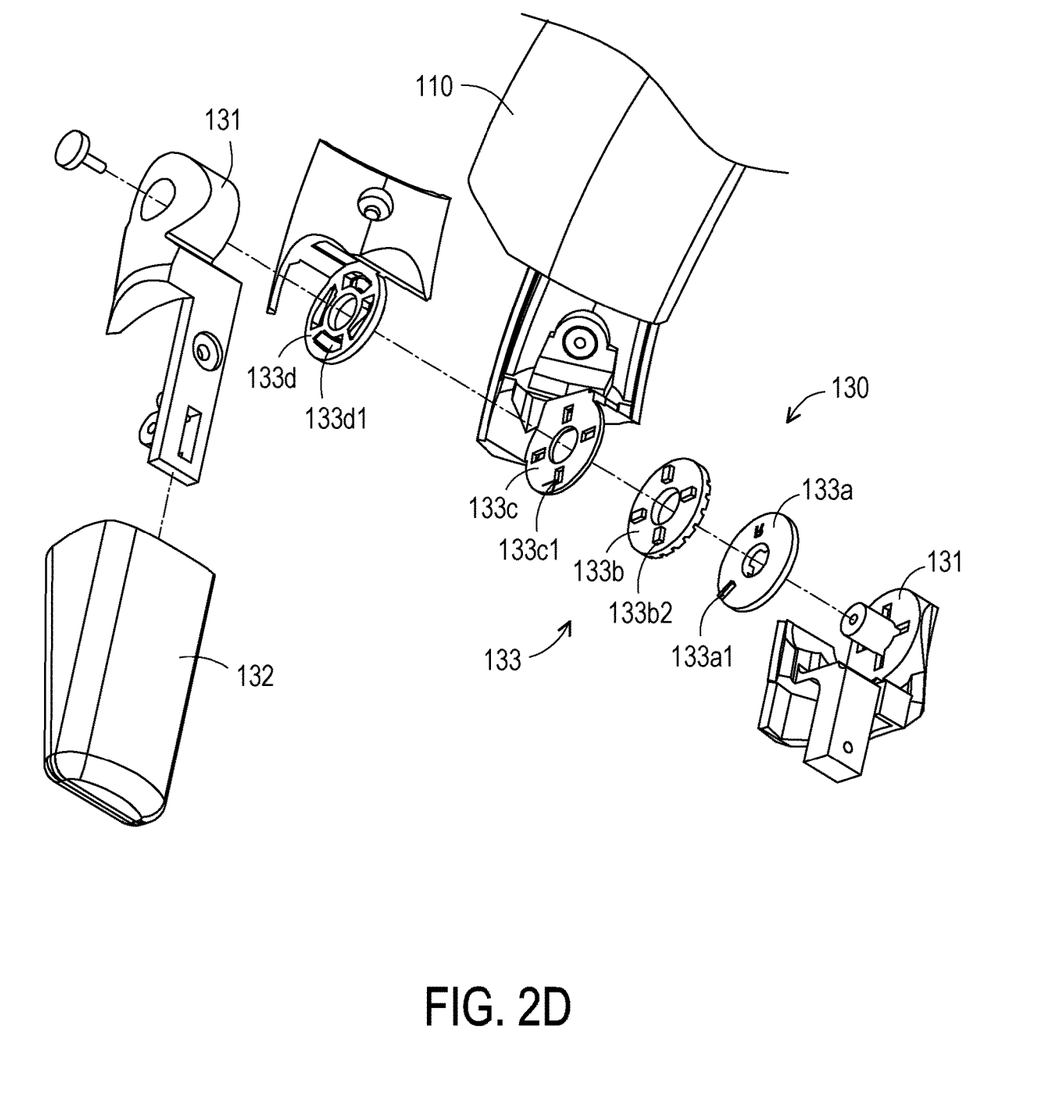
FIG. 2D is an exploded view of the rotate arm of FIG. 2B.
Figure 3A:
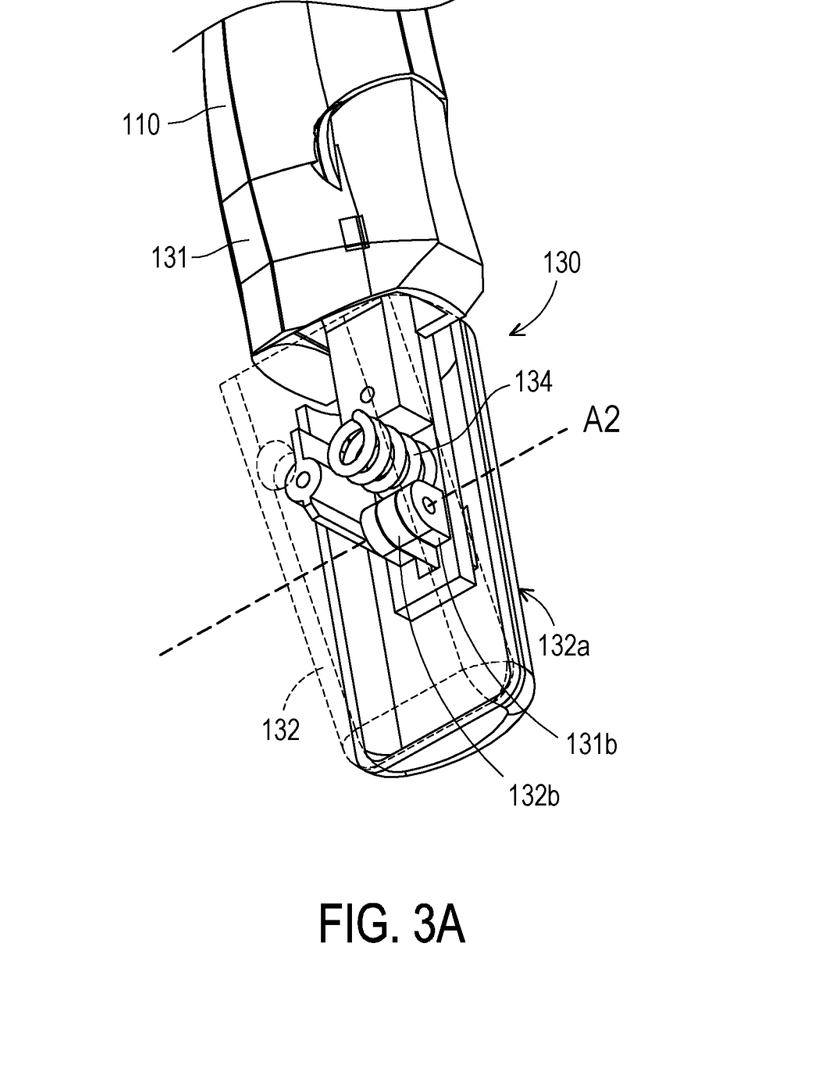
FIG. 3A is a partially enlarged view of the neck-mounted power bank of FIG. 1A.
Figure 3B:
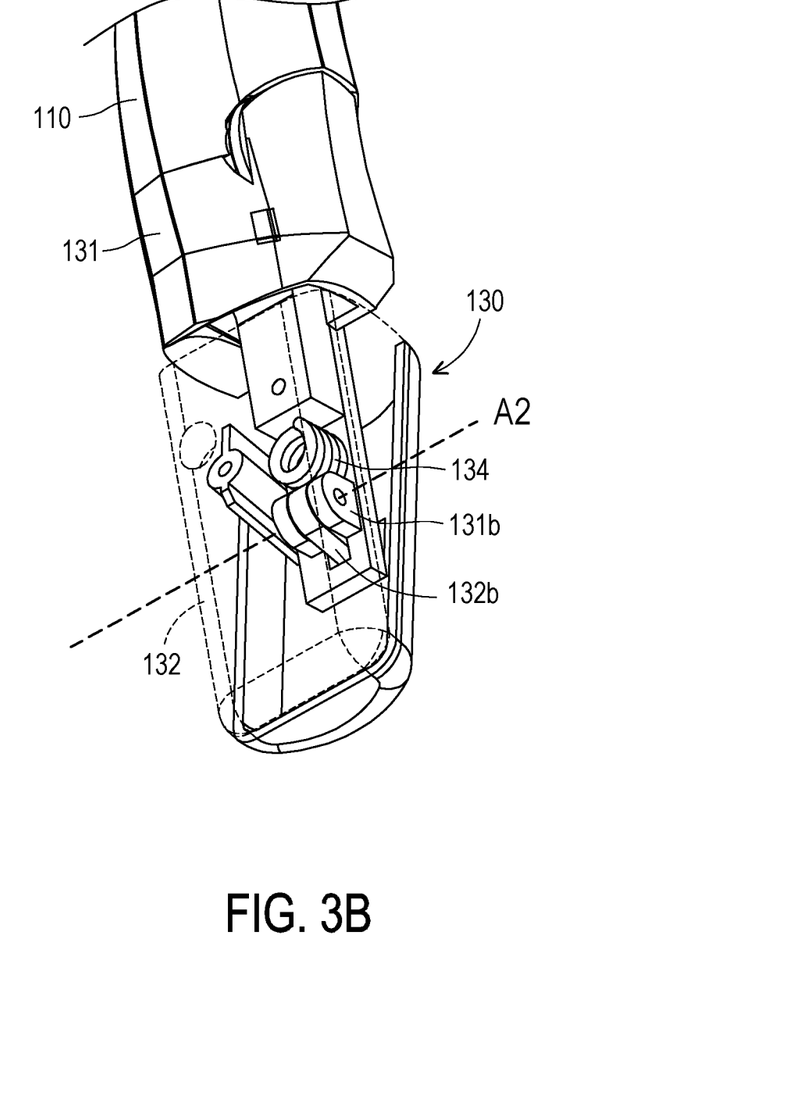
FIG. 3B is a partially enlarged view of the neck-mounted power bank of FIG. 1B.
Figure 3C:
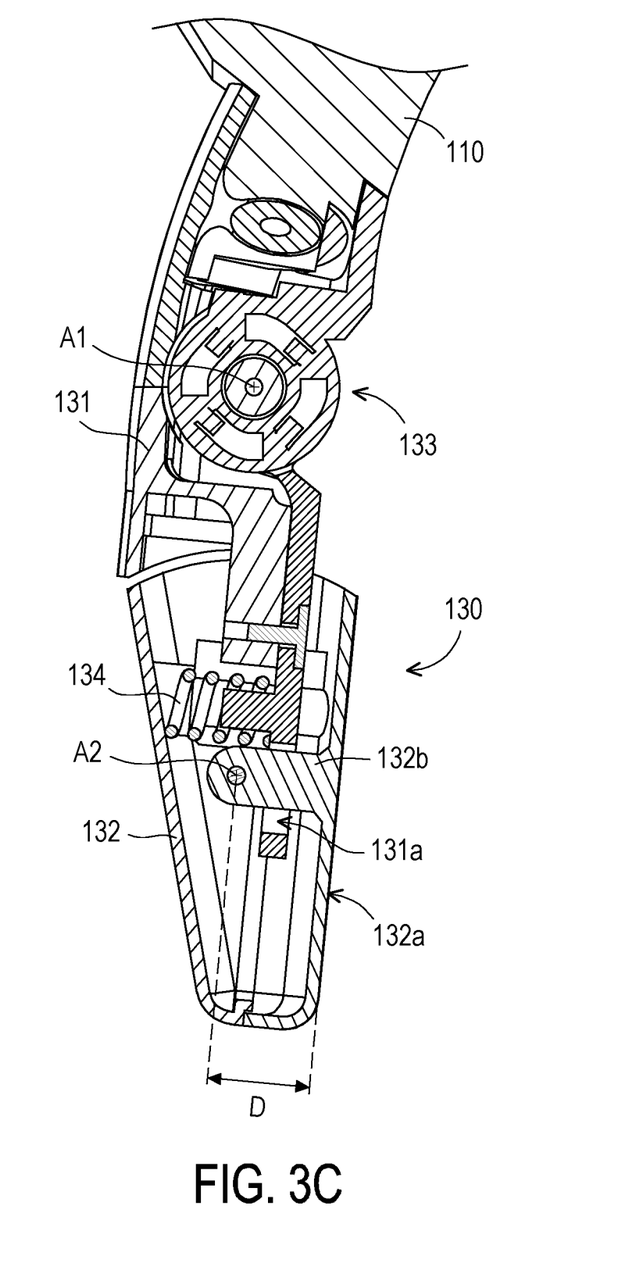
FIG. 3C is a partially cross-sectional view of the neck-mounted power bank of FIG. 3A.
Figure 3D:
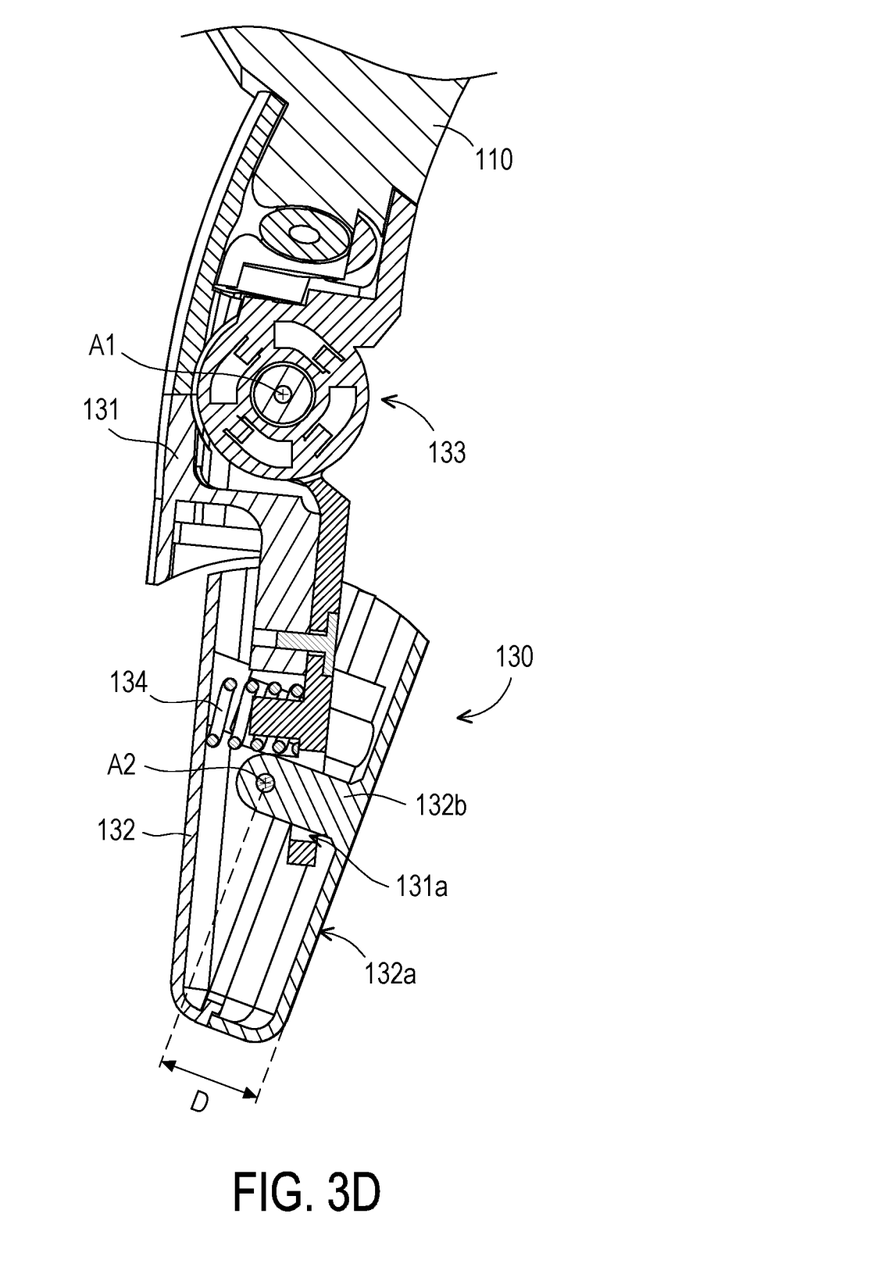
FIG. 3D is a partially cross-sectional view of the neck-mounted power bank of FIG. 3B.

Referring to FIG. 1A and FIG. 1B, a neck-mounted power bank 100 of this embodiment is suitable for being hung on a neck 10 of the user to supply power to an electronic device (for example, a head-mounted display device). The neck-mounted power bank 100 includes a body 110, one or more batteries 120, and a pair of adjustable assemblies 130. The multiple batteries 120 are disposed in the body 110, and the pair of adjustable assemblies 130 are respectively connected to two opposite ends of the body 110. In this embodiment, the body 110 and the pair of adjustable assemblies 130 define a wearing space W. The pair of adjustable assemblies 130 may be rotated relative to the body 110 so as to adjust the size of the wearing space W.

Each of the pair of adjustable assemblies 130 includes a rotate arm 131 and an angle arm 132. The rotate arm 131 is rotatably connected to a corresponding end of the body 110. The angle arm 132 is connected to the rotate arm 131 and has a contact surface 132a. The contact surface 132a is suitable for contacting the neck 10 of the user. In this embodiment, the angle arm 132 is rotatably connected to the rotate arm 131. That is, the angle arm 132 may rotate relative to the rotate arm 131, such that the contact surface 132a fits the neck 10 of the user better.

In this embodiment, the neck-mounted power bank 100 may include an electrical cable 140. One end of the electrical cable 140 is connected to the body 110, and the other end of the electrical cable 140 is connected to the electronic device, so that the neck-mounted power bank 100 supplies power to the electronic device. Nevertheless, the batteries 120 of the neck-mounted power bank 100 may also be charged by the electrical cable 140.

Referring to FIG. 2A to 2D, in this embodiment, each of the pair of adjustable assemblies 130 further includes a multiple stage adjustment mechanism 133, and the multiple stage adjustment mechanism 133 is pivotally connected to the rotate arm 131 and the body 110. The multiple stage adjustment mechanism 133 includes a first adjustment member 133a, a second adjustment member 133b, a fixing member 133c, and an elastic member 133d. The second adjustment member 133b and the fixing member 133c are disposed between the first adjustment member 133a and the elastic member 133d. The first adjustment member 133a is connected to the rotate arm 131. The first adjustment member 133a includes an adjustment convex portion 133a1, the adjustment convex portion 133a1 is located on one side of the first adjustment member 133a facing the second adjustment member 133b. The second adjustment member 133b includes multiple adjustment recess portions 133b1 and multiple engaging convex portions 133b2. Each of the adjustment recess portions 133b1 is adapted to accommodate the adjustment convex portion 133a1, furthermore, the multiple adjustment recess portions 133b1 and the multiple engaging convex portions 133b2 are disposed on opposite sides of the second adjustment member 133b. The fixing member 133c is fixedly connected to the body 110 and includes multiple engaging slots 133c1. The engaging slots 133c1 are penetrated respectively by the engaging convex portions 133b2. The elastic member 133d is fixedly connected to the body 110 and includes multiple elastic arms 133d1 protruding toward the fixing member 133c, the elastic arms 133d1 correspond to the engaging slots 133c1 respectively.

In this embodiment, the rotate arm 131 on a first rotation axis A1 is rotatably connected to the body 110. When the rotate arm 131 is rotated relative to the body 110, the first adjustment member 133a rotates along with the rotate arm 131 relative to the second adjustment member 133b, the fixing member 133c, and the elastic member 133d, so that the adjustment convex portion 133a1 is separated from the original corresponding adjustment recess portion 133b1. At this moment, the second adjustment member 133b is pushed by the adjustment convex portion 133a1 to move toward the direction of the fixing member 133c, so that the engaging convex portions 133b2 penetrate the engaging slots 133c1 respectively and then push the elastic arms 133d1. When the rotate arm 131 is adjusted to a desired position and the adjustment convex portion 133a1 is engaged with one of the adjustment recess portions 133b1, an angle between the rotate arm 131 and the body 110 is fixed. At this moment, the force exerted on the second adjustment member 133b is released, the elastic arms 133d1 force the second adjustment member 133b to move toward the direction of the first adjustment member 133a by the engaging convex portions 133b2 to ensure the engagement between the adjustment convex portion 133a1 and a currently corresponding adjustment recess portion 133b1.

In this embodiment, the rotate arm 131 rotates relative to the body 110 by the adjustment mechanism 133, and adjust the angle between the rotate arm 131 and the body 110 by the engagement between the adjustment convex portion 133a1 and the adjustment recess portion 133b1, and thereby adjusting the size of the wearing space W. When adjusting the wearing space W to a smaller size, it is only necessary to rotate these rotate arms 131 relative to the body 110 in a direction closer to each other. When adjusting the wearing space W to a larger size, it is only necessary to rotate these rotate arms 131 relative to the body 110 in a direction farther from each other.

Referring to FIG. 3A to FIG. 3D, in this embodiment, the angle arm 132 is rotatably connected to the rotate arm 131 on a second rotation axis A2, and the first rotation axis A1 and the second rotation axis A2 are parallel to each other. The angle arm 132 further includes a movable part 132b, the rotate arm 131 further includes a grooving 131a and a fixed part 131b. The movable part 132b penetrates the grooving 131a and is pivotally connected to the fixed part 131b on the second rotation axis A2. That is, the rotate arm 131 is connected to the movable part 132b through the fixed part 131b and is pivotally connected to the angle arm 132. On the other hand, the second rotation axis A2 is separated from the contact surface 132a by a distance D, and an orthographic projection of the second rotation axis A2 on the contact surface 132a is located between opposite ends of the contact surface 132a. When the angle arm 132 is subject to external force and thereby rotating relative to the rotate arm 131, the angle arm 132 takes the movable part 132b as a fulcrum to present a seesaw mode. When the user adjusts the adjustable assemblies 130 and wears the neck-mounted power bank 100 on the neck 10 of the user, the angle arm 132 adjusts the angle thereof between the rotate arm 131 based on the size of the neck 10 of the user, such that the contact surface 132a contacts the neck 10 of the user with maximum contact area, so as to increase the stability and comfort of wearing.

In this embodiment, each of the adjustable assemblies 130 further includes a reset member 134. The reset member 134 is disposed between a corresponding angle arm 132 and a corresponding rotate arm 131. When the external force received by the angle arm 132 is released, the reset member 134 automatically drives the corresponding angle arm 132 to rotate relative to the corresponding rotate arm 131 back to an initial position.

Figure 4:
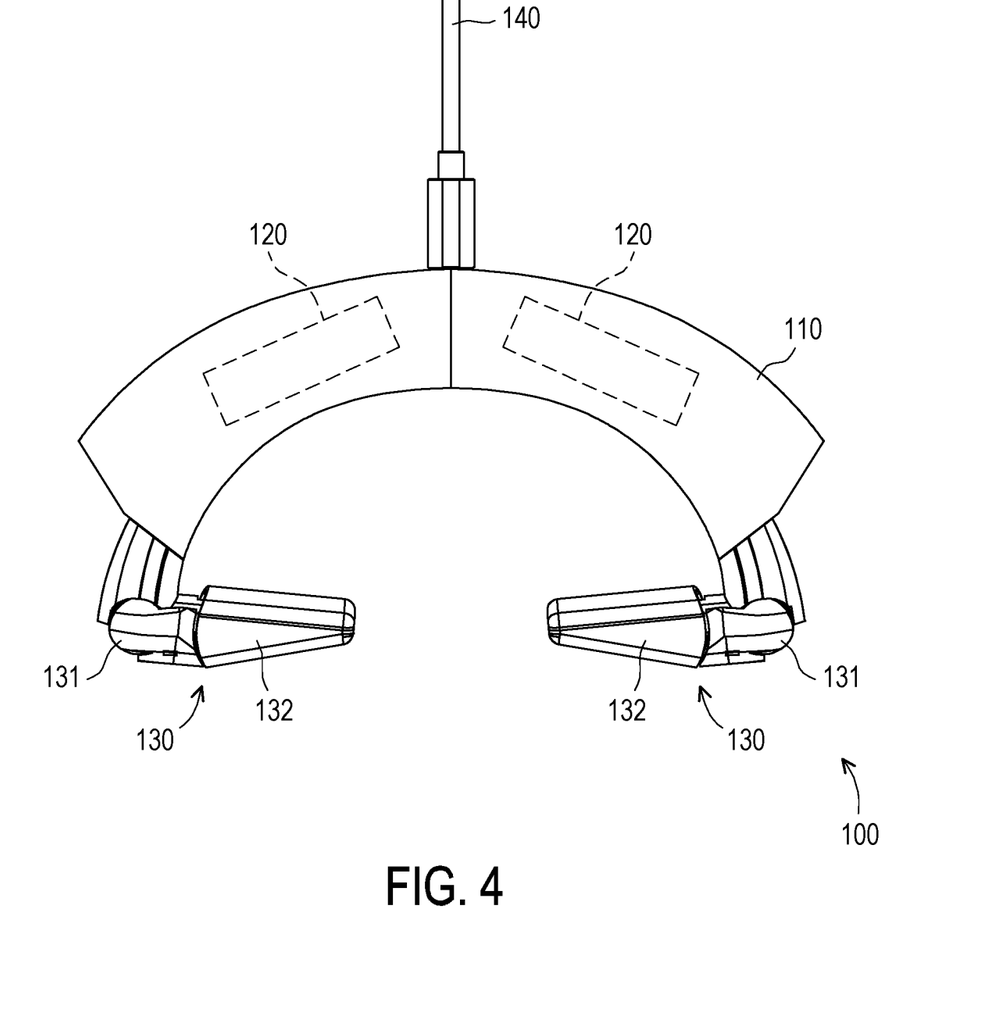
FIG. 4 is a schematic view of the neck-mounted power bank of FIG. 1A in received mode.

Referring to FIG. 4, when the neck-mounted power bank 100 needs to be stowed, the rotate arm 131 may be rotated relative to the body 110 toward each other, so that the rotate arm 131 and the angle arm 132 are folded inward. In this mode, the rotate arm 131 is rotated to the inner side of the body 110, so that the neck-mounted power bank 100 may be easily stowed.

Figure 5A:
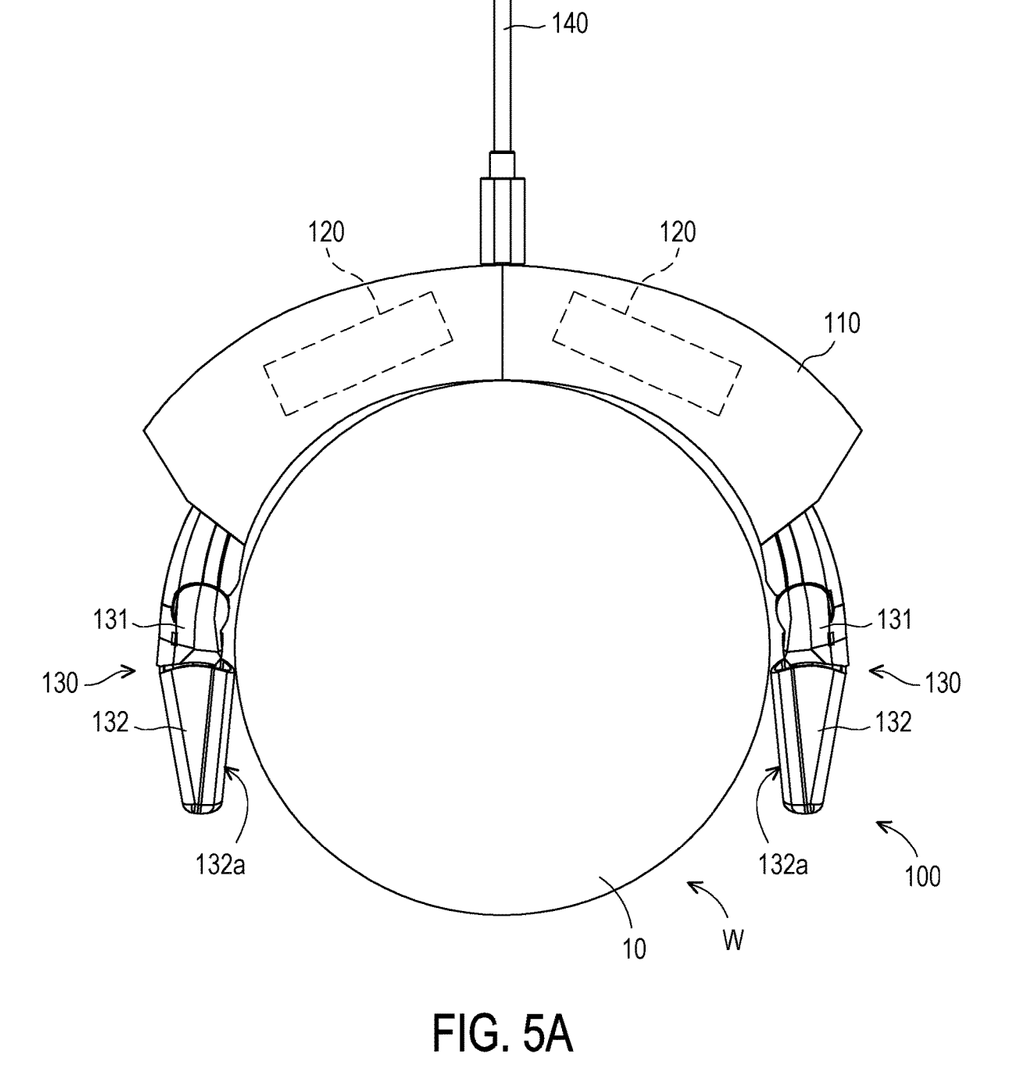
FIG. 5A is a schematic view of the neck-mounted power bank of another embodiment of the invention.
Figure 5B:
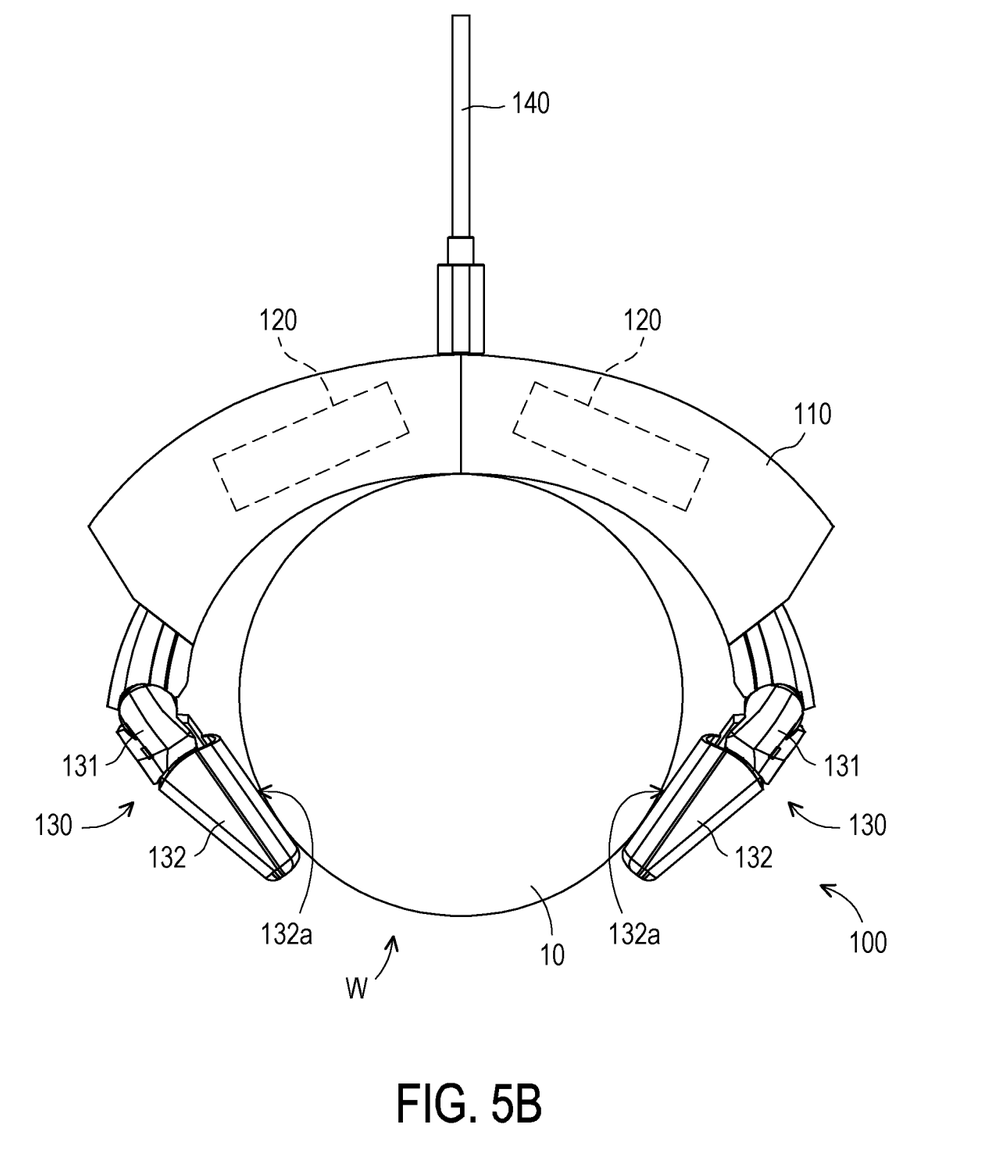
FIG. 5B is a schematic view of the neck-mounted power bank of FIG. 5A in another usage mode.

FIG. 5A and FIG. 5B are substantially the same as the embodiment of FIG. 1A. The difference between the two is that, in this embodiment, the angle arm 132 and the rotate arm 131 are fixed to each other. That is, the angle arm 132 cannot rotate relative to the rotate arm 131. In this embodiment, the user adjusts the size of the wearing space W by adjusting the adjustable assemblies 130, and the angle between the adjustable assemblies 130 and the body 110 is changed simultaneously, thereby increasing the contact area between the contact surface 132a and the neck 10 of the user, thus allowing the user to wear the neck-mounted power bank 100 more comfortably.

In summary, in the disclosure, the neck-mounted power bank may be worn on the user's neck and is connected to the electronic device by an electrical cable. Since the adjustable assemblies may be rotated relative to the body, the user may change the size of the wearing space of the neck-mounted power bank through adjusting the adjustable assemblies to fit the size of the user's neck. The user may adjust the angle of the adjustable assemblies to increase the contact area between the neck-mounted power bank and the user's neck, thereby increasing the stability and comfort of wearing. In addition, since the neck-mounted power bank may be worn on the user's neck, the user may spare his or her hands to perform light exercises such as yoga.

What is claimed is:

1. A neck-mounted power bank suitable for being hung on a user's neck to supply power to an electronic device, the neck-mounted power bank comprising:
    a body;
    a battery, disposed in the body;
    an electrical cable, wherein one end of the electrical cable is connected to the battery, and the other end of the electrical cable is adaptable for connecting to the electronic device; and
    a pair of adjustable assemblies, respectively connected to two ends of the body, and defining a wearing space with the body, wherein the pair of adjustable assemblies are able to be rotated relative to the body so as to adjust a size of the wearing space, each of the pair of adjustable assemblies comprising:

a rotate arm, rotatably connected to a corresponding end of the body on a first rotation axis;

an angle arm, connected to the rotate arm and having a contact surface, wherein the contact surface is adaptable for contacting the user's neck, wherein each of the pair of adjustable assemblies further comprises a multiple stage adjustment mechanism, the multiple stage adjustment mechanism comprising:

a first adjustment member, connected to the rotate arm and having an adjustment convex portion; and a second adjustment member, having a plurality of adjustment recess portions and a plurality of engaging convex portions, wherein each of the adjustment recess portions is suitable for accommodating the adjustment convex portion, and the adjustment recess portions and the engaging convex portions are disposed on opposite sides of the second adjustment member;

when the rotate arm rotates relative to the body, the first adjustment member rotates along with the rotate arm relative to the second adjustment member, when the adjustment convex portion moves relative to the adjustment recess portions and is engaged with one of the adjustment recess portions, an angle between the rotate arm and the body is fixed.

2. The neck-mounted power bank according to claim 1, wherein the multiple stage adjustment mechanism further comprising:

a fixing member, fixedly connected to the body and having a plurality of engaging slots, wherein the engaging slots are penetrated respectively by the engaging convex portions; and an elastic member, fixedly connected to the body and having a plurality of elastic arms protruding toward the fixing member, wherein the elastic arms correspond to the engaging slots respectively, and the second adjustment member and the fixing member are disposed between the first adjustment member and the elastic member, when the rotate arm of each of the pair of adjustable assemblies rotates relative to the body, the first adjustment member corresponding to the pair of adjustable assemblies rotates along with the rotate arm of one of the pair of adjustable assemblies relative to the second adjustment member corresponding to the pair of adjustable assemblies, the fixing member, and the elastic member, the second adjustment member is pushed by the adjustment convex portion, so that the engaging convex portions penetrate the engaging slots respectively and then push the elastic arms, when the adjustment convex portion moves relative to the adjustment recess portions and is engaged with one of the adjustment recess portions so that the angle between the rotate arm of each of the pair of adjustable assemblies and the body is fixed, the elastic arms force the second adjustment member corresponding to the pair of adjustable assemblies to move toward a direction of the first adjustment member corresponding to the pair of adjustable assemblies by the engaging convex portions to ensure an engagement between the adjustment convex portion and the currently corresponding adjustment recess portion.

3. The neck-mounted power bank according to claim 1, wherein the angle arm of each of the pair of adjustable assemblies is fixedly connected to the rotate arm corresponding to one of the pair of adjustable assemblies.

4. The neck-mounted power bank according to claim 1, wherein the angle arm of each of the pair of adjustable assemblies is rotatably connected to the rotate arm corresponding to one of the pair of adjustable assemblies on a second rotation axis, so that the contact surface fits the user's neck.

5. The neck-mounted power bank according to claim 4, wherein the second rotation axis is separated from the contact surface by a distance, and an orthographic projection of the second rotation axis on the contact surface is located between opposite ends of the contact surface.

6. The neck-mounted power bank according to claim 4, wherein the angle arm of each of the pair of adjustable assemblies further comprises a movable part, the rotate arm of each of the pair of adjustable assemblies further comprises a grooving and a fixed part, and the movable part penetrates the grooving and is pivotally connected to the fixed part on the second rotation axis, so that when the angle arm of each of the pair of adjustable assemblies rotates relative to the rotate arm corresponding to one of the pair of adjustable assemblies, the angle arm of each of the pair of adjustable assemblies takes the second rotation axis as a fulcrum to present a seesaw mode.

7. The neck-mounted power bank according to claim 6, wherein each of the pair of adjustable assemblies further comprises a reset member, the reset member of each of the pair of adjustable assemblies is disposed between the angle arm corresponding to the pair of adjustable assemblies and the rotate arm corresponding to one of the pair of adjustable assemblies, and when the angle arm of each of the pair of adjustable assemblies is not subject to an external force relative to the rotate arm corresponding to one of the pair of adjustable assemblies, the reset member of each of the pair of adjustable assemblies drives the angle arm corresponding to one of the pair of adjustable assemblies to rotate relative to the rotate arm corresponding to one of the pair of adjustable assemblies back to an initial position.

* * * * *